H. S. SAYLOR.
WHEEL.
APPLICATION FILED JUNE 20, 1907.

946,617.

Patented Jan. 18, 1910.

WITNESSES

INVENTOR
HARRIE S. SAYLOR
BY Paul & Paul
HIS ATTORNEYS.

UNITED STATES PATENT OFFICE.

HARRIE S. SAYLOR, OF BUFFALO, MINNESOTA.

WHEEL.

946,617.

Specification of Letters Patent.  Patented Jan. 18, 1910.

Application filed June 20, 1907. Serial No. 379,897.

*To all whom it may concern:*

Be it known that I, HARRIE S. SAYLOR, of Buffalo, Wright county, Minnesota, have invented certain new and useful Improvements in Wheels, of which the following is a specification.

My invention relates to vehicle wheels and particularly to those of the resilient type, and the object of the invention is to provide a wheel of simple economical construction, one which will be very durable and which will carry a load without shock or jar, even on an uneven pavement or rough country road.

The invention consists generally in various constructions and combinations, all as hereinafter described and particularly pointed out in the claims.

Figure 1:
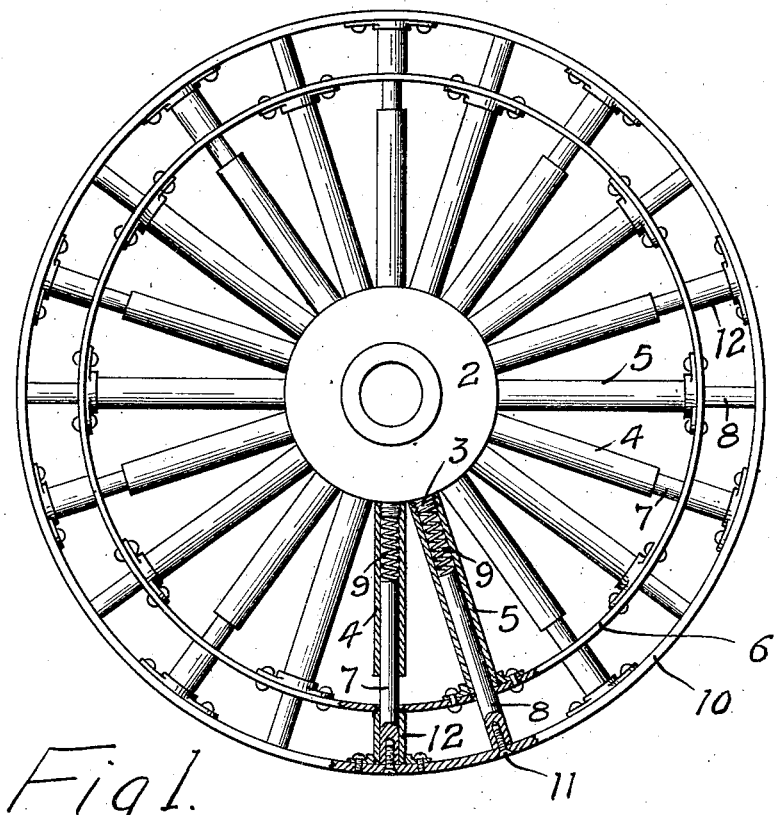
Figure 2:
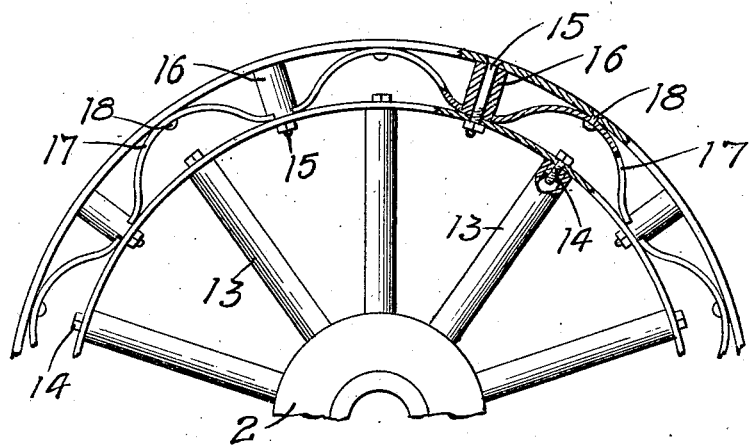

In the accompanying drawings, forming part of this specification, Figure 1 is a side elevation partially in section of a wheel embodying my invention. Fig. 2 is a detail sectional view of a modified construction of the wheel.

In the drawing, 2 represents the hub of the wheel provided on its periphery with a series of radiating threaded studs 3. On these studs a series of tubes 4 and 5 having interiorly threaded ends are mounted and radiate from the hub in a manner similar to the spokes of an ordinary wheel. The tubes 4 and 5 are alternately arranged, the tubes 5 being longer than the tubes 4 and the outer ends of the tubes 5 are secured to a rim 6 preferably of thin sheet metal. Within the tubes 4 and 5 plungers 7 and 8 are arranged and having their inner ends adapted to bear on coiled springs 9 within the tubes 4 and 5, the plungers 7 and 8 are adapted to slide within the said tube and in holes in the rim 6, and the outer ends of the plungers are secured to a second or outer rim 10 which is concentric with the rim 6 and is spaced therefrom. The plungers are secured to the outer rim by any suitable means as the screws 11. Both rims are made of resilient material and pressure on the outer rim will be transmitted through the plungers to the compression springs between the inner ends of the plungers and the hub of the wheel. These springs therefore increase the resiliency of the rims.

Between the inner and outer rims and inclosing the plunger 7, short tubes 12 are provided secured to the outer rim and bearing on the surface of the inner rim and transmitting the pressure on the outer rim to the inner one. The tubes 4 act as guides for the plungers 7 and do not contact with the inner rim and consequently when pressure is applied to the outer rim the inner one will yield and coöperate with the outer rim to take up the shock or jar and prevent transmission of the same to the body of the vehicle. The tubes 5 bearing on the inner rim will prevent it from yielding and the load thrown upon the plungers 8 will force them into the tubes 5 against the tension of the springs 9. The tubes 4 and 5 alternate around the wheel and consequently the load will be sustained by both rims and be equally distributed between them by means of the tubes and plungers and the transmission of the strain from one rim to the other. The tubes 4 and 5 and the plungers 7 and 8 comprise telescoping spokes for the wheel and their alternate arrangement allows the full degree of resiliency of both rims to be utilized without any danger of distorting or destroying the perfect circle of the wheel. In other words, the load will be so evenly distributed on the rims by the construction described that the perfect form of the wheel and its resilient characteristics will be preserved even under a heavy load.

In Fig. 2 I have illustrated a modified construction which consists in providing tubular spokes 13 between the hub and the inner rim and secured to the latter by bolts 14. Bolts 15 connect the outer with the inner rim at intervals and the rims are held in their concentric relation with one another by elongated washers 16 through which the bolts 15 extend. Bow-shaped springs 17 have their middle portions secured to the outer rim by rivets 18 and their ends held between the washers 16 and the inner rim. Pressure on the outer rim will be taken up by the springs 17 and the load on the outer rim between the springs 17 will be transmitted by the washers 16 to the inner rim. In this way the strain will be evenly distributed upon both rims, pressure on the outer rim at one point being transmitted directly to the inner rim and at another point being taken up by the bow-shaped springs. Spokes 13 alternate with the washers 16 and are preferably in line with the centers of the bow-shaped springs. These spokes hold portions of the inner rim rigidly in place but permit sections thereof to which the washers are secured to yield with the pressure on the outer rim.

I claim as my invention:

1. A wheel comprising a hub, an inner and an outer resilient rim concentrically arranged and inclosing said hub, spokes radiating from said hub and rigidly secured to said inner rim, means rigidly connecting said outer rim with said inner rim whereby pressure on said outer rim will be transmitted to said inner rim, and means alternating with said connecting means and yieldingly resisting pressure on said outer rim.

2. A wheel comprising a hub, and inner and outer resilient rims concentrically arranged and inclosing said hub, a series of spokes rigidly secured to said hub and said inner rim, and a series of spokes yieldingly connecting said outer rim with said hub and non-yielding connections provided between said rims, substantially as described.

3. A wheel comprising a hub having relatively long and short tubular spokes, resilient rims concentrically arranged, the inner rim bearing on the outer ends of the long tubular spokes, plungers secured to the outer rim and sliding within said long tubular spokes, plungers secured to the outer rim and adapted to slide through the inner rim and in said short tubular spokes, and suitable spacing devices connecting the said two rims near said last named plungers, substantially as described.

4. A wheel comprising a hub having tubular spokes 4 and 5 and resilient rims concentrically arranged, the inner rim being secured to the outer ends of the spokes 5, and the spokes 4 being shorter than the spokes 5 and normally out of contact with said inner rim, plungers 7 and 8 attached to said outer rim, and slidably mounted through said inner rim in said tubular spokes, compression springs interposed between the inner ends of said plungers and said hub and yieldingly resisting inward movement of the same, and spacing tubes inclosing said plungers 7 between said rims and contacting therewith, whereby the pressure on said outer rim will be transmitted through said plungers and spacing tubes to said springs and said inner rim, substantially as described.

In witness whereof, I have hereunto set my hand this 15 day of June 1907.

HARRIE S. SAYLOR.

Witnesses:
J. T. ALLEY,
FRED GREEN.